United States Patent [19]

Altomare

[11] Patent Number: 4,631,262
[45] Date of Patent: Dec. 23, 1986

[54] METHOD OF MAKING SEED SOLUTION USEFUL IN ZEOLITE CATALYST MANUFACTURE

[75] Inventor: Carol A. Altomare, Hillsborough Township, Somerset County, N.J.

[73] Assignee: Engelhard Corporation, Menlo Park, N.J.

[21] Appl. No.: 741,511

[22] Filed: Jun. 5, 1985

[51] Int. Cl.$^4$ .................. B01J 29/08; B01J 21/12
[52] U.S. Cl. ........................... 502/65; 502/68; 502/232; 423/328
[58] Field of Search .................. 502/65, 68, 232, 233, 502/263; 423/328

[56] References Cited

U.S. PATENT DOCUMENTS

| | | | |
|---|---|---|---|
| 3,310,373 | 3/1967 | Johnson | 502/263 X |
| 3,582,494 | 6/1971 | Vossos et al. | 502/232 |
| 4,217,240 | 8/1980 | Bergna | 502/263 |
| 4,493,902 | 1/1985 | Brown et al. | 502/65 |

*Primary Examiner*—Carl F. Dees
*Attorney, Agent, or Firm*—Inez L. Moselle

[57] ABSTRACT

The useful storage life of a clear solution of seeds used to initiate the crystallization of zeolite in porous microspheres of calcined clay is increased by adding sodium silicate solution to a matured seed solution.

10 Claims, No Drawings

METHOD OF MAKING SEED SOLUTION USEFUL IN ZEOLITE CATALYST MANUFACTURE

BACKGROUND

This invention relates to the production of sodium aluminosilicate seed solutions intended to be used to initiate the crystallization of zeolitic sodium aluminosilicate molecular sieves from sources of sodium oxide, aluminum oxide and silicon dioxide. More particularly, the invention relates to improvements in the production of a clear seed solution to be used, for example, to initiate crystallization of zeolitic molecular sieves by the so-called "external" zeolite growth initiator (seed) procedure described in U.S. Pat. No. 4,493,902, "Fluid Catalytic Cracking Catalyst Comprising Microspheres Containing More Than About 40 Percent by Weight Y-Faujasite and Methods of Making the Same." The teachings of U.S. Pat. No. 4,493,902, including test procedures cross-referenced therein, are incorporated herein by reference thereto.

The process of the '902 patent generally involves immersing preformed porous microspheres comprising a mixture of calcined kaolin clays, in an alkaline sodium silicate reaction solution to crystallize high levels of sodium zeolite Y, above 40% as determined by X-ray diffraction, throughout the microspheres. This is followed by removal of mother liquor from the crystallized microspheres which are then ion-exchanged with suitable cations or combinations of cations to reduce the sodium oxide level to low levels. The resulting fluid cracking catalyst microspheres are characterized by exceptionally high activity, desirable selectivity and, in most preferred embodiments, an attrition-resistance better than or comparable to currently available fluid cracking catalysts.

In one embodiment of the invention, the reaction is "internally" seeded. That is, the seeding material is contained in precursor microspheres containing calcined kaolin clay. In another embodiment of the invention, the reaction is "externally" seeded, i.e., the growth initiator is added to the aqueous slurry containing precursor microspheres and sodium silicate solution. The '902 patent discloses (col. 13, 1. 50 to 56) that the mixture containing amorphous zeolite initiator (seeds) is preferably clear when external seeding is employed. The patent states that external seeds that are cloudy can result in crystallization products having a higher EAI (poorer attrition-resistance) than is desired and that excessive fines can be generated during the crystallization process when cloudy seeds are used.

To produce the desired clear seed solution the '902 patent discloses that sodium silicate, sodium aluminate and sodium hydroxide solutions are mixed to produce a solution of desired $Na_2O$, $Al_2O_3$, $SiO_2$ and $H_2O$ content. The ingredients used to form the clear seed solution are heated at 100° F. before mixing and are mixed in a controlled manner. The resulting mixture is covered and aged quiescently for about 6 hours at 100° F. (to mature the seeds) and the clear solution is then added to a reactor along with a mixture of sodium silicate solution and microspheres of calcined clay. The '902 patent indicates (col. 13, 1. 40–45) that the mixture is clear when solutions of sodium silicate and sodium aluminate are mixed but that after aging at about 100° F. for about 24 hours or longer, the solution begins to acquire a cloudy appearance.

It is now believed that cloudy seeds contain larger particles which cannot penetrate into the pores of the microspheres of calcined clay, whereby zeolite tends to grow on the surface of the microspheres instead of within the microspheres. Consequently, crystallized microspheres may be more porous and less attrition resistant. It is not presently known why the use of cloudy seeds may contribute to the generation of excessive fines in the reactor.

Prior to the present invention, it was recognized that it would be desirable to extend the period over which a clear seed solution could be stored without becoming cloudy. It was discovered that the useful life of the seed solution could be extended by cooling the solution. For example, in some cases, the mature seed solution would remain clear for as long as about 48 hours if the solution were cooled appreciably below 100° F., e.g., 70° F., by external cooling means. By extending the useful life of the seed solution a single large batch could be fed to a multiplicity of reactors. If the solution were not cooled, the time available for introducing the cooled seed solution with the reactants would be short. This would have a deleterious effect on the efficient operation of the process in a commercial plant since it would make it difficult to use a single batch of seed solution to feed a plurality of reactors. However, cooling is an expensive means to prolong the useful life of a clear seed solution, especially so when the seed solution is to be stored for 48 hours or longer.

THE INVENTION

I have now discovered that the enrichment of a solution of matured amorphous seeds solution with an alkaline sodium silicate solution increases the useful life of the seeds. The sodium silicate enrichment may also be used to rejuvenate mature seed solutions that are already cloudy, or even gelled. The economic benefit is particularly significant when the sodium silicate solution is incorporated into seed solutions which are still clear.

Accordingly, in a most preferred embodiment of the present invention, a seed solution intended for use in initiating crystallization of synthetic crystalline zeolite of the Y-type by reaction of preformed porous microspheres composed of a mixture of calcined kaolin clays with an alkaline solution of sodium silicate is obtained by mixing appropriate quantities of sodium silicate, sodium aluminate and sodium hydroxide, preferably in a controlled manner, hereinafter described, heating the resulting mixture for a time sufficient for the seeds to mature but insufficient for cloudiness to occur, and thereafter adding to the matured solution a portion of the sodium silicate reactant that would normally be included in the reaction slurry including the porous microspheres of calcined clay. The sodium silicate added to the matured seed solution is preferably at ambient temperature when it is added to the solution. The amount of sodium silicate solution added to the solution of matured clear seeds is effective to result in a seed solution which will maintain its clarity when aged for 48 hours or longer (without cooling). In effect, enrichment of a clear solution of matured seeds with sodium silicate functions to quench the undesirable reaction(s) that may take place and which would result in undesired cloudiness.

In another embodiment of the invention, a solution of matured seeds which has become clouded or gelled is made clear by adding additional sodium silicate solution, the amount of sodium silicate solution being effective to assure that the previously clouded or gelled solution will maintain its clarity when aged for 48 hours or longer without cooling. In this case, the sodium silicate enriched seed mixture is optionally, but preferably, heated and then permitted to age at ambient temperature. I prefer to heat after addition of sodium silicate because clarification will take place in a shorter time.

In both embodiments of the invention, the quantity of sodium silicate used for seed enrichment must be subtracted from the sodium silicate that is added to the reaction slurry including porous microspheres of calcined clay. The amount of sodium silicate used initially to prepare clear seeds is limited because an excess will prevent maturation.

As used herein, the term "solution of zeolite seed" shall include any aqueous solution containing silica, alumina and soda that either allows a zeolite crystallization process that would not occur in the absence of the seed material or shortens significantly the zeolite crystallization process that would occur in the absence of the seed material.

An estimate of the "cloudiness" of seeds is described by % transmission. This refers to the optical transmission of a sample of seeds measured at a wavelength of 540 nanometers over a 1 cm light path. The instrument used to measure transmission (Bausch & Lomb Spectronic 21) is calibrated by testing deionized water and assigning it a value of 100% transmission. The transmission of all seed batches is then relative to this standard.

The following quality control test which uses light transmission was devised to determine the onset of maturity of seeds. When the ingredients used to make the seed solution are mixed together a sample is taken and aged at 110° F. The light transmission of this sample is measured over time. When the transmission drops to less than 80% (from an initial value of 95%), the seeds are judged to be mature. The limit of this transmission test is that it is not sensitive enough to be run on the seed batch itself. By the time a measurable change is observed in the seeds, they are well past maturity and are starting to turn cloudy. Thus, it is recommended that this transmission test be used in conjunction with a quality control crystallization test.

A preferred quality control test is one in which the ratios of ingredients are altered to give a shorter crystallization time than would be obtained using preferred ratio of reactants such as described immediately before Example 1, below. More specifically, the caustic dosage is significantly increased. The following are added in the order listed to a 250 ml. Pyrex ® glass reactor provided with a stirrer:

23.5 g solution of seeds being tested
162.7 g 44% sodium disilicate solution
30.3 g 19.25% NaOH
89.3 g $H_2O$
36.0 g microspheres made from a 50/50 mixture of hydrous kaolin and kaolin calcined substantially through its characteristic exotherm which were calcined under conditions that converted the hydrous kaolin to metakaolin while leaving the other portion unaffected.

In carrying out the preferred quality control test, the reactants are added with the stirrer in operation. The reactor is placed in a water bath maintained at 210° F. An aliquot is withdrawn after 2 hours, washed with water, dried and analyzed for percentage sodium zeolite Y by X-ray. The presence of any amount more than 10% sodium zeolite Y is a positive test result and indicates the solution of seeds is mature and can be used.

Light scattering can also be used to determine seed maturity. A satisfactory instrument is a light scattering monophotometer, supplied by C. N. Wood, Newtown, Pa. When a solution of seeds is matured, a significant increase in light scattering is observed.

DESCRIPTION OF PREFERRED EMBODIMENTS

Generally, the amount of sodium silicate solution added to a clear solution of seeds is from about 12.5% to 85% preferably about 12.5% to 50%, by volume of the resulting diluted solution. When insufficient sodium silicate solution is added, the benefits may not be achieved. The upper limit to the amount of sodium silicate is dictated by the limit to the total amount of sodium silicate reactant employed in the crystallization. Any soluble sodium silicate can be used. All soluble sodium silicates produce alkaline solutions. I have had excellent results using sodium disilicate or sodium silicates having the approximate $Na_2O/SiO_2$ ratios of the disilicate. For example, the sodium silicate obtained by concentrating mother liquor from the manufacture of cracking catalyst can be used. See U.S. Pat. No. 4,493,902. Mixtures of sodium silicates can be employed.

As described in examples of the '902 patent, the clear seed solution is prepared by mixing sodium silicate solution of approximate 2/1 $SiO_2/Na_2O$ molar ratio (i.e., 14.8 wt. % $Na_2O$, 28.6 wt % $SiO_2$) with water, separately mixing a sodium aluminate solution with sodium hydroxide, heating both solutions and adding the diluted sodium silicate solution to the solution of sodium aluminate while stirring the latter. The mixture is then heated. The '902 patent also discloses (col. 13, 1. 38–39) that the two solutions can be added simultaneously to the mixture, with rapid mixing. It has now been found that the latter procedure is preferable. It has also been found that the relative addition rates of the sodium silicate and sodium aluminate solution will affect seed aging characteristics.

An especially preferred method for preparing seeds is detailed below for laboratory preparation but is readily adaptable for commercial implementation. By the seed procedure described hereinafter, addition rates can be accurately controlled. The solutions used are as follows: sodium aluminate (Nalco #2372) plus additional 25% (wt. basis) NaOH solution; and sodium disilicate solution. A masterflex pump is connected to each of two 500 ml burets with Tygon plastic tubing. The burets act as feed columns for the solutions. A hot water bath is heated with a steam coil connected to a solenoid valve. The temperature is regulated with a temperature controller that acts on a solenoid, which adjusts the amount of steam entering the heating coil. The water bath is mixed constantly with a mixer. The temperature of the bath is usually maintained at 100° F. unless otherwise specified. To make-up the sodium aluminate solution, the required amount of the sodium aluminate and 25% NaOH are weighed out and placed into one container. In another container, the sodium disilicate solution is combined with the necessary amount of dilution water. Deionized water may be used but is not necessary. Each solution should be well mixed and the specific gravity determined for each.

Initially, a small amount of the sodium disilicate solution is added at ambient temperature to the "makedown" beaker so that the preparation is silica rich during the addition. Typically, the amount added is the difference in the weights of the aluminate and silicate solutions. The beaker with the added sodium disilicate solution is clamped into the water bath. A Talboy bladed stirrer is set into position in the beaker. The blade is kept as far down in the beaker as possible without scraping the bottom of the beaker.

The burets are filled with the SAS (sodium aluminate) and SDS (sodium silicate) solutions, both at ambient temperature. The same buret should always be used for the same solutions. The Tygon lines are bled by circulating the solutions with the pump. It may be necessary to put the pump in reverse direction to achieve this.

The pump rates are set by timing how long it takes to pump 20 ml of solution into a 100 ml graduated cylinder. The graduated cylinder should be cleaned before testing the rate of the other material. After the pump rates are set, the pumps are turned off by disconnecting the plug; consequently, the pump settings are not changed.

The agitation is started in the beaker. The addition of the materials is started by activating the pumps. At first, both materials are fed onto the blade of the stirrer. As the level of seeds rises in the beaker, the material is added into the vortex formed. The agitation is kept slow at first and gradually increased as the materials are added. The agitation should be kept at a maximum without splashing the material out of the beaker. The time it takes to add both materials should be measured with a stopwatch. After all the materials have been pumped over into the beaker, the seeds are allowed to mix for a minimum of two minutes.

The stirrer is then removed and the beaker covered with plastic and sealed. In the case that material in the beaker is not under the surface of the water in the water bath, the batch should be split into two separate beakers for aging. The seeds are then allowed to age for a specified amount of time in the hot water bath.

Equivalent Rate Calculations:

Seed batches are normally run at an equivalent rate of 1.25. Equivalent rate is defined as:

$$\frac{\text{Actual } SDS \text{ Rate}}{SDS \text{ Rate needed to run out at same time as } SAS} = \frac{(A)}{(B)}$$

where:

(A): The volume of SDS divided by the (experimental) time it took to run out. Volume of SDS is determined by the mass of SDS divided by its specific gravity.

(B): The volume of SDS (as determined in A) divided by the (experimental) time it took for the "SAS" to run out.

Sample Calculation:

Typical batch was 408.4 g SAS (SpG = 1.2)

605.6 g SDS (SpG = 1.4)

197.2 g SDS added first to "make-up" tank. For example if SAS addition requires 6 minutes and SDS requires 4.8 minutes, the equivalent rate is 1.25.

$$\text{Actual } SDS \text{ rate} = \frac{605.6 - 197.2 \text{ g}}{1.4 \text{ g/cc}} / 4.8 \text{ min.} = 60.8 \text{ cc/min.}$$

SDS rate needed to run out at same time =

$$\frac{605.6 - 197.2 \text{ g}}{(1.4 \text{ g/cc}) 6 \text{ min.}} = 48.6 \text{ g/min.}$$

$$\text{Equivalent Rate} = \frac{60.8}{48.6} = 1.25$$

Recommended seed solutions have the following composition on a molar basis prior to adding sodium silicate diluent:

| | Preferred | Especially Preferred |
|---|---|---|
| $H_2O/Na_2O$ | 15–18 | 17.94 |
| $Na_2O/SiO_2$ | 0.9–1.1 | 1.00 |
| $SiO_2/Al_2O_3$ | 15.5–19 | 17.55 |

The preferred materials used to prepare the seed solution are sodium silicate of approximate 2/1 molar ratio, preferably a concentrated (44%) by-product of catalyst manufacture analyzing about 14.8 wt % $Na_2O$, 28.6% $SiO_2$, the balance being water (See U.S. Pat. No. 4,493,902); a 25% (wt) solution of NaOH and Nalco 2372 sodium aluminate solution (typically analyzing 18.3% $Na_2O$, 19.9% $Al_2O_3$). The composition of the seed solution on a weight basis is:

| Composition of Seed Solution - Basis 100# Seeds | | | | | |
|---|---|---|---|---|---|
| | Total | $Al_2O_3$ | $SiO_2$ | $Na_2O$ | $H_2O$ |
| Sodium Silicate (44%) | 46.64 | 0 | 13.34 | 6.90 | 26.40 |
| NaOH (25%) | 29.21 | 0 | 0 | 5.66 | 23.55 |
| Sodium Aluminate | 6.48 | 1.29 | 0 | 1.19 | 4.00 |
| Water | 17.67 | 0 | 0 | 0 | 17.67 |
| Total | 100.00 | 1.29 | 13.34 | 13.75 | 71.62 |

(This total corresponds to a molar composition of 17.5 $Na_2O$: 1.00 $Al_2O_3$: 17.5 $SiO_2$: 313 $H_2O$.)

To insure reasonable and reproduceable aging, relative addition rates for the silicate and aluminate solutions are such the desired chemical composition is approached from the alumina-deficient side as described above in detail. The alumina content should never exceed about 1.29% $Al_2O_3$ and will reach this level only upon completion of the batch.

The ingredients used to form the solution of seeds may be heated at temperatures in the range of about 70° to 120° F., preferably about 100° F., during the mixing step and may be maintained at temperatures in the range of about 80° to 120° F., preferably about 100° F., to mature the seeds. At temperatures appreciably below 100° F., the time required for the seeds to mature may be too long for effective commercial practice. At temperatures appreciably above 100° F., zeolite growth may be impaired.

The composition of the seed solution after quenching by addition of sodium silicate will depend on the amount of silicate added and the chemical composition of the sodium silicate solution.

Compositions of seed solutions after dilution with sodium silicate appear below.

| Composition of Sodium Silicate Diluted Seeds | | |
|---|---|---|
| | Preferred | Especially Preferred |
| $H_2O/Na_2O$ | 13–17 | 16.68 |

-continued

| Composition of Sodium Silicate Diluted Seeds | | |
|---|---|---|
| | Preferred | Especially Preferred |
| $SiO_2/Al_2O_3$ | 23–206 | 30.47 |
| $Na_2O/SiO_2$ | 0.54–.87 | 0.823 |

Preferably, the porous microspheres in which the zeolite is crystallized comprise, before the crystallization reaction, about 30–60% by weight metakaolin clay and about 40–70% by weight kaolin clay that has been calcined at least substantially through its characteristic exotherm. The microspheres contain no hydrous clay or at most less than about 10% by weight of hydrous clay. The calcined clay microspheres have average particle diameters that are typical of commercial fluid catalytic cracking catalysts, e.g., 65–70 microns. During the crystallization process, it is believed that some of the alumina and silica of the clay microspheres is leached from those microspheres, leaving a non-zeolitic component. This non-zeolitic component is referred to as the "zeolite crystallization process residue of calcined clay".

The preferred process for making the microspheres of calcined kaolin clay comprises a series of steps. First, finely divided hydrous kaolin clay (e.g., ASP ® 600, a commercially available hydrous kaolin clay described in Engelhard Technical Bulletin No. TI-1004, entitled "Aluminum Silicate Pigments" (EC-1667)) is calcined at least substantially through its characteristic exotherm. For example, a one inch bed of the hydrous kaolin clay may be calcined for about 1–2 hours in a muffle furnace at a chamber temperature of about 1800°–1900° F. to produce clay that has been calcined through its characteristic exotherm without any substantial formation of mullite. As another example, a substantial portion of the hydrous kaolin clay may be calcined through its characteristic exotherm into mullite by calcining a one inch bed of the clay in an electrically heated furnace at a chamber temperature higher than about 2100° F.

During calcination, some of the finely divided clay agglomerates into larger particles. After completion of calcination, the agglomerated clay is pulverized into finely divided particles.

Next, an aqueous slurry of finely divided hydrous kaolin clay and the clay that has been calcined through its characteristic exotherm is prepared. The aqueous slurry is then spray dried to obtain microspheres comprising a mixture of hydrous clay and clay that has been calcined at least substantially through its characteristic exotherm. Preferably, a small amount of sodium silicate is added to the aqueous slurry before it is spray dried. It is believed that during and after spray drying the sodium silicate functions as a binder between the clay particles.

After spray drying, the microspheres are calcined at a temperature and for a time (e.g., for 2 hours in a muffle furnace at a chamber temperature of about 1350° F.) sufficient to convert the hydrous clay in the microspheres to metakaolin. The resulting microspheres comprise a mixture of metakaolin and kaolin clay that has been calcined at least substantially through its characteristic exotherm in which the two types of calcined clay are present in the same microspheres. Preferably, the microspheres comprise about 30–60% by weight metakaolin and about 40–70% by weight kaolin clay that has been calcined through its characteristic exotherm. The calcined microspheres may include mullite. See U.S. Pat. No. 4,493,902.

In the process described above, the metakaolin and kaolin clay that has been calcined at least substantially through its characteristic exotherm are present in the same microspheres. It should be understood, however, that the process of U.S. Pat. No. 4,493,902, in a broader scope, encompasses deriving the nonzeolitic component of the microspheres of our invention from other sources of calcined clay. For example, the patentees state that they believe that the non-zeolitic component of microspheres comprising more than about 40% by weight Y-faujasite and having the activity, selectivity, hydrothermal stability and attrition resistance characteristics can be derived from microspheres comprising a mixture of metakaolin and kaolin clay that has been calcined through its characteristic exotherm without any substantial formation of mullite in which the two types of calcined clay are in separate microspheres.

The calcined clay microspheres are mixed with one or more sources of sodium silicate and water to form a slurry. The sodium silicate diluted solution of amorphous zeolite seed is also added to the slurry. Preferably, the resulting slurry contains: (a) a solar ratio of $Na_2O/SiO_2$ in the solution phase of about 0.47–0.77; and (b) a weight ratio of $SiO_2$ in the solution phase to microspheres of calcined clay of about 0.38–2.5. The preferred order of addition of reagents to a reactor involves initial addition of solution of seeds, followed by sodium disilicate and then water. Microspheres of calcined clay are added last. If necessary, a solution of sodium hydroxide may be included in the slurry to adjust the $Na_2O$ in the solution phase to an appropriate level. When sodium hydroxide is used, it is preferable to add this material to the reactor after addition of the seeds. For example, sodium hydroxide solution can be added immediately after addition of sodium silicate and before addition of water. As used herein, the "solution phase" of the slurry shall include all the material added to the crystallization reactor (including the solution of sodium silicate diluted zeolite seeds) except the material constituting the calcined clay microspheres.

The following molar and weight ratios of constituents added to the crystallization reactor have provided satisfactory results (unless otherwise indicated the ratios given are molar ratios).

| Solution Phase $Na_2O$/<br>Solution Phase $SiO_2$ | wt. Solution Phase $SiO_2$/<br>wt. Microspheres |
|---|---|
| 0.57 | 1.00 |
| 0.52 | 1.35 |
| 0.50 | 1.50 |
| 0.49 | 1.70 |
| 0.77 | 0.38 |

The molar ratios of all the constituents present in the crystallization reactor at the commencement of the crystallization process typically are within the following ranges:

| $Na_2O/SiO_2$ | $SiO_2/Al_2O_3$ | $H_2O/Na_2O$ |
|---|---|---|
| 0.30–0.60 | 3–13 | 20–35 |

The preferred weight ratio of water to calcined clay microspheres at the beginning of the crystallization process is about 2–12. In order to minimize the size of the crystallization reactor, it is preferred to maximize the amount of calcined kaolin clay microspheres added to the reactor and to minimize the amount of water present during the crystallization process. However, as this is done, the unit cell size of the zeolite crystals increases. The preferred ratio of water to microspheres is, therefore, a compromise between that which results in maximum solids content in the crystallization reactor and that which results in a minimum unit cell size of the zeolite.

Good crystallization was obtained when the constituents added to the crystallization reactor provided the following molar and weight ratios at the commencement of the crystallization process (unless otherwise indicated the ratios given are molar ratios):

| $Na_2O/SiO_2$ | $SiO_2/Al_2O_3$ | $H_2O/Na_2O$ | wt. $H_2O$/wt. microspheres |
|---|---|---|---|
| .390 | 7.90 | 22.2 | 4.9 |
| .362 | 5.65 | 27.3 | 4.5 |
| .576 | 12.7 | 30.4 | 11.3 |

The sodium silicate and sodium hydroxide reactants may be added to the crystallization reactor from a variety of sources. For example, the reactants may be provided as an aqueous mixture of N ® Brand sodium silicate and sodium hydroxide. As another example, at least part of the sodium silicate may be provided by the mother liquor produced during the crystallization of another zeolite containing product, e.g., a concentrated mother liquor by-product produced during the manufacture of an Engelhard HFZ ® catalyst. Such a concentrated mother liquor by-product typically might contain about 15.0% by weight $Na_2O$, 29% by weight $SiO_2$ and 0.1% by weight $Al_2O_3$. Crystallization proceses of the type used to manufacture HFZ ® catalysts are described in U.S. Pat. No. 3,647,718.

After the crystallization process is terminated, the microspheres containing Y-faujasite are separated from at least a substantial portion of their mother liquor, e.g., by filtration. It may be desirable to wash the microspheres by contacting them with water either during or after the filtration step. The purpose of the washing step is to remove mother liquor that would otherwise be entrained within the microspheres.

The microspheres contain crystalline Y-faujasite in the sodium form. In order to obtain a product having acceptable catalytic properties, it is necessary to replace sodium cations in the microspheres with more desirable cations. This is accomplished by contacting the microspheres with solutions containing ammonium or rare earth cations or both. The ion exchange step or steps are preferably carried out so that the resulting catalyst contains at least about 4%, preferably at least about 7%, by weight REO and less than about 0.7%, most preferably less than about 0.3%, by weight $Na_2O$. After ion exchange, the microspheres are dried, preferably by flash drying, to obtain the microspheres of the present invention.

The preferred catalyst of the invention of U.S. Pat. No. 4,493,902 comprises microspheres containing about 50–70% by weight Y-faujasite. As used herein, Y-faujasite shall include synthetic faujasite zeolites exhibiting, in the sodium form, an x-ray diffraction pattern of the type described in Breck, Zeolite Molecular Sieves, p. 369, Table 4.90 (1974), and having a crystalline unit cell size, in the sodium form (after washing any crystallization mother liquor from the zeolite), of less than about 24.75A as determined by the technique described in the ASTM standard method of testing titled "Determination of the Unit Cell Size Dimension of a Faujasite Type Zeolite" (Designation D3942-80) or by an equivalent technique. The term Y-faujasite shall encompass the zeolite in its sodium form as well as in the known modified forms, including, e.g., rare earth and ammonium ion exchanged forms and stabilized forms. The percentage of Y-faujasite zeolite in the microspheres of the catalyst is determined when the zeolite is in the sodium form (after it has been washed to remove any crystallization mother liquor contained within the microspheres) by the technique described in the ASTM standard method of testing titled "Relative Zeolite Diffraction Intensities" (Designation D3906-80) or by an equivalent technique.

It is preferred that the Y-faujasite component of the microspheres, in their sodium form, have a crystalline unit cell size of less than about 24.73A and most preferably less than about 24.69A. Typically, the Y-faujasite component of the microspheres has a crystalline unit cell size of about 24.64–24.73A. We believe that a unit cell size range of between 24.64–24.73A corresponds to a $SiO_2/Al_2O_3$ molar ratio of the Y-faujasite of about 4.1–5.2.

In the examples which follow, microspheres comprising a mixture of metakaolin and kaolin clay that has been calcined through its characteristic exotherm were prepared by the following general procedure:

A slurry was prepared by mixing 4565 parts by weight of Satintone ® No. 1 calcined kaolin (a commercially available finely divided kaolin clay that has been calcined through its characteristic exotherm without any substantial formation of mullite, described in the Engelhard Technical Bulletin entitled "Aluminum Silicate Pigments" identified above), 4565 parts by weight of ASP ® 600 hydrous kaolin, 1753 parts by weight of a sodium disilicate solution analyzing 28.4% by weight $SiO_2$, 15.2% by weight $Na_2O$), and 8155 parts by weight of $H_2O$. The slurry was spray dried in a commercial spray dryer and calcined in a rotary calciner under conditions estimated to correspond to calcination in a muffle furnace at 1350° F. for 2 hours using about a one inch bed of the spray dried microspheres in the muffle furnace. The calcination was carried out to convert the hydrous kaolin in the microspheres to metakaolin. In the tests described in the illustrative examples, batches of microspheres from different production runs were used.

Solutions of mature amorphous seeds were prepared using the following ingredients and procedure:

| | | |
|---|---|---|
| Sodium Aluminate | 169.5 g | (18.2% $Na_2O$, 3.9% $Al_2O_3$) |
| NaOH | 10.2 g | (24.77% NaOH) |
| Sodium Silicate | 245.6 g | (27.2% $SiO_2$, 14.6% $Na_2O$, 0.1% $Al_2O_3$) |
| HFZ ® Catalyst Mother Liquor Concentrate | | |
| $H_2O$ (deionized) | 82.7 g | |

One third of the sodium silicate and all of the water were weighed into a 1 liter Pyrex ® beaker. The sodium hydroxide and sodium aluminate were combined and poured into a 500 ml buret. The remaining silicate was added to second 500 ml buret. These were pumped into the beaker at a controlled rate such that the rate of SDS addition was 1.25 greater than the rate of SAS addition. Under these conditions, mature seeds usually occur after 12 hours at 100° F.

The amounts of the ingredients added in a control test in which matured seeds were not diluted with sodium silicate are given below:

98.1 g solution of matured seeds, prepared as described above
692.0 g SDS (27.2% $SiO_2$, 14.6% $Na_2O$, 0.1% $Al_2O_3$)
328.1 g deionized $H_2O$
210.0 g microspheres of calcined clays The reflux reactor was closed and continuously stirred during addition of ingredients. The ingredients were heated to 210°–214° F. to initiate the crystallization reaction and were maintained at that temperature, with stirring, for 21 hours. At that time, a small portion of the microspheres was removed from the crystallization reactor, washed with a 1:1 rato of deionized water to microspheres and dried. The criterion for a satisfactory crystallization result is that the washed and dried microspheres contain at least 55% by weight Y-faujasite, having a unit cell size of 24.70A or below.

When the seeds were diluted with sodium disilicate, in accordance with this invention, the amount of silicate added to the seeds was subtracted from the amount added during crystallization. The crystallization procedure was identical to that used with undiluted seeds. For example, the ingredients used in the crystallization carried out with dilution of the mature seeds with 33% by volume [28% by weight] sodium disilicate was as follow:

36.1 g diluted seeds (98.1 g seeds +38.0 g SDS)
654.0 g SDS
328.1 g $H_2O$
210.0 g microspheres of calcined clay

EXAMPLE 1

One particular matured seed batch, prepared as described above, aged very quickly and was cloudy (60% light transmission) before cooling could be started. Concentrated (44%) sodium disilicate was then added to keep it from clouding further. Surprisingly, the addition of 1000 gallons of sodium disilicate to 7000 gallons of seeds eventually improved the transmission to 94% while the batch was cooling. Crystallizations from these seeds appeared to be no different than any other crystallization, and the seed batch stayed clear for at least 66 hours.

While it was known that enough added silicate would slow the aging of seeds, and even reduce cloudiness (described in the previous example), the overall effectiveness of the silicate addition on a cloudy seed batch was quite unexpected.

EXAMPLE 2

Based on results summarized under Example 1, the silicate quench was further evaluated. Several tests were run using other batches of seeds with initial varying seed transmissions. The data collected for one of these tests when slightly cloudy seeds were used (starting transmission=81%) is shown in Table 1. While not quite as effective as results indicated in Example 1 when the starting material was already cloudy, the silicate quench was nevertheless effective is clearing seeds and then maintaining their useful life. In fact, with the addition of a sufficient amount of sodium disilicate, the useful life could be maintained without cooling. It was found that the minimum amount of silicate needed depended on how cloudy the seeds were, and how long it was desired to store them before eventual use. Crystallization data in Table I also indicate that when cloudy seeds were cleared, they begin to perform more as clear seeds would be expected to perform.

TABLE 1

Crystallization Data ($Na^+$ Form Zeolitic Microspheres) Seeds Quenched with Silicate

| Composition of Solution of Seeds | Transmission of Solution of Seeds | | Composition of Crystallized Microspheres | | | | | | | |
|---|---|---|---|---|---|---|---|---|---|---|
| | Initial Transmission % | Transmission at use % | Zeolite % | Molar $SiO_2/Al_2O$ Ratio | Particle Size of Microspheres, Microns Microtrac | | | | | EAI/Bulk Density |
| | | | | | −20u | −40u | −60u | −80u | APS | |
| Uncrystallized microspheres | | | | | 10 | 27 | 57 | 79 | 55 | |
| Control (NO SDS added) | | 94* | 55 | 4.54 | 15 | 21 | 43 | 63 | 66 | .81/.83 |
| SDS Added Vol. % | Time Elapsed After Quench | | | | | | | | | |
| 25% | 148 hours | 55 | 72 | 52 | 4.31 | 26 | 31 | 50 | 66 | 60 | 1.3/.78 |
| 50 | 123 | | 91 | 51 | 4.42 | 18 | 26 | 46 | 74 | 64 | .75/.81 |
| 50 | 148 | | 93 | 60 | 4.31 | 15 | 27 | 55 | 76 | 56 | .93/.76 |
| 87.5 | 123 | | 94 | 58 | 4.31 | 11 | 21 | 41 | 70 | 60 | .82/.81 |
| 12.5 | 74 | 81 | 66 | 55 | 4.65 | 25 | 36 | 69 | 85 | 49 | 1.4/.74 |
| 25 | 74 | | 86 | 55 | 4.42 | 21 | 32 | 64 | 82 | 51 | 1.1/.79 |
| 50 | 74 | | 94 | 58 | 4.42 | 15 | 25 | 63 | 80 | 53 | .91/.79 |
| 50 | 245 | | 94 | 56 | 4.42 | 13 | 21 | 44 | 72 | 64 | .84/.81 |

*Control tested immediately after seeds matured.

That is, fewer fines formed and attrition resistance improved. (The somewhat high EAI values even for the control are attributed to the highly porous microsphere used in this particular series of tests.)

Since the sodium disilicate is part of the crystallization charge and the added silicate is simply accounted for by subtracting that amount from the amount that would be added to the reaction change, up to 8 gallons of sodium disilicate can be added per gallon of seeds. This limitation is based on the amount of $SiO_2$ required for crystallization. (Sodium silicate in excess of this amount could be added but the excess would not serve a useful purpose.) When using up to 8 gallons of sodium disilicate per gallon of seeds, the seeds will remain clear for >10 days even with no cooling. However, storage capacity might be a problem in large scale commercial practice. A level of 12.5–25% added silicate [SDS/(SDS+seeds)=0.125–0.25] was determined to be preferable.

EXAMPLE 3

Samples of clear seeds with added sodium silicate were stored at 70°-75° F. The clear seeds with added sodium disilicate appeared to have a longer useful storage life than if they were simply cooled to the same temperature with no added sodium disilicate. For example, a clear solution of seeds with no added sodium disilicate was stored at about 70°-75° F. for 41 and 83 hours; transmission values were 81% and 10%, respectively. On the other hand, a clear solution of seeds with sodium disilicate added at levels of 10%, 30% and 50% (based on total volume) exhibited the following transmissions when the solutions were stored at about 70°-75° F. for 83 hours; 86%, 89% and 89%, respectively.

The examples described above are given for illustrative purposes. In those examples, the seeded reaction between alkaline sodium silicate and microspheres of calcined clay to form zeolite Y in situ was carried out with porous microspheres composed of a mixture of calcined kaolin clays in the form of metakaolin (kaolin calcined to undergo endothermic dehydration) and kaolin calcined to undergo the exotherm. I believe that the improved clear seed preparation techniques of the present invention will also be useful in other externally seeded in situ reactions between porous microspheres composed of calcined clay (or other porous shaped particles such as pellets or honeycomb containing calcined clay or the like) and sources of soluble $Na_2O$ and $SiO_2$ in the mother liquor. Examples of the latter are the externally seeded in situ reaction between microspheres consisting of kaolin calcined to undergo the exotherm and sodium hydroxide to crystallize zeolite Y, as described in U.S. Pat. No. 4,243,514, Brown et al. Another example is the externally seeded reaction between microspheres consisting of metakaolin and a solution-containing sodium silicate and sodium hydroxide as described in Canadian Pat. No. 907,708.

I claim:

1. The method for increasing the storage life of a clear solution of amorphous sodium aluminosilicate seeds prepared by mixing solutions of sodium silicate, sodium aluminate and sodium hydroxide, used in proportion such as to form a clear solution, heating said solution to mature the seeds in said solution, and diluting the clear seed solution by adding an effective amount of alkaline sodium silicate solution.

2. The method of claim 1 wherein the matured seed solution has a molar composition within the following range:

| | |
|---|---|
| $H_2O/Na_2O$ | 15 to 18 |
| $Na_2O/SiO_2$ | .9 to 1.1 |
| $SiO_2/Al_2O_3$ | 15.5 to 19 |

3. The method of claim 1 wherein the matured seed solution has the following approximate molar composition:

| | |
|---|---|
| $H_2O/Na_2O$ | 18 |
| $Na_2O/SiO_2$ | 1 |
| $SiO_2/Al_2O_3$ | 18 |

4. The method of claim 1 wherein the matured seed solution has the following molar composition:

| | |
|---|---|
| $H_2O/Na_2O$ | 17.94 |
| $Na_2O/SiO_2$ | 1.00 |
| $SiO_2/Al_2O_3$ | 17.55 |

5. The method of claim 1 wherein the seed solution after addition of said effective amount of sodium silicate has a molar composition within the following range:

| | |
|---|---|
| $H_2O/Na_2O$ | 13-17 |
| $SiO_2/Al_2O_3$ | 23-206 |
| $NaO/SiO_2$ | .54-.87 |

6. The method of claim 1 wherein the seed solution after addition of said effective amount of sodium silicate has the following molar composition:

| | |
|---|---|
| $H_2O/Na_2O$ | 16.68 |
| $SiO_2/Al_2O_3$ | 30.47 |
| $Na_2O/SiO_2$ | 0.823 |

7. The method of claim 1 wherein said alkaline sodium silicate solution added to said clear solution of seeds has a $SiO_2/Na_2O$ molar ratio of about 2/1, a concentration in the range of about 30 to 45% and is used in amount of about 12.5% to 85% of the volume of the resulting diluted solution of seeds.

8. The method for clarifying a solution of sodium aluminosilicate seeds which was clear when the seeds matured but has become cloudy or gelled during aging at about ambient or elevated temperature which comprises adding an effective amount of alkaline sodium silicate solution to a cloudy or gelled solution, optionally heating until the solution becomes clear, and then allowing the solution to cool and age.

9. The method of claim 1 wherein said seed solution is employed to initiate the crystallization of zeolite Y in step (e) of a process for making a fluid catalytic cracking catalyst comprising the steps of:

(a) forming an aqueous slurry of finely divided hydrous kaolin clay and finely divided kaolin clay that has been calcined at least substantially through its characteristic exotherm;

(b) spray drying the aqueous slurry to obtain microspheres comprising a mixture of hydrous kaolin clay and kaolin clay that has been calcined at least substantially through its characteristic exotherm;

(c) calcining the microspheres obtained in step (b) at a temperature and for a time sufficient to convert the hydrous kaolin clay in the microspheres substantially to metakaolin and to obtain microspheres of calcined clay comprising a mixture of about 30-60% by weight metakaolin and about 40-70% by weight kaolin clay that has been calcined at least substantially through its characteristic exotherm;

(d) mixing the microspheres obtained in step (c) with the sodium silicate diluted clear seed solution prepared in claim 1 and with one or more sources of sodium silicate and water to obtain an alkaline slurry of microspheres of calcined clay in an aqueous solution containing sodium silicate, the sodium silicate used to dilute the clear seeds plus the sodium silicate added in step (d) being provided in amounts such that microspheres having a $SiO_2/Al_2O_3$ molar ratio of about 1.7-3.4 are obtained in step (f) below;

(e) heating the slurry of microspheres of calcined clay to a temperature and for a time sufficient to crystallize at least about 40% by weight Y-faujasite in the microspheres, said Y-faujasite being in the sodium form;
(f) separating the microspheres containing at least about 40% by weight Y-faujasite from at least a major portion of its mother liquor;
(g) and replacing sodium cations in the microspheres separated in step (f) with ammonium or rare earth cations or both.

10. The method of claim 8 wherein said seed solution is employed to initiate the crystallization of zeolity Y in step (e) of a process for making a fluid catalytic cracking catalyst comprising the steps of:
(a) forming an aqueous slurry of finely divided hydrous kaolin clay and finely divided kaolin clay that has been calcined at least substantially through its characteristic exotherm;
(b) spray drying the aqueous slurry to obtain microspheres comprising a mixture of hydrous kaolin clay and kaolin clay that has been calcined at least substantially through its characteristic exotherm;
(c) calcining the microspheres obtained in step (b) at a temperature and for a time sufficient to convert the hydrous kaolin clay in the microspheres substantially to metakaolin and to obtain microspheres of calcined clay comprising a mixture of about 30–60% by weight metakaolin and about 40–70% by weight kaolin clay that has been calcined at least substantially through its characteristic exotherm;
(d) mixing the microspheres obtained in step (c) with the sodium silicate diluted clear seed solution prepared in claim 1 and with one or more sources of sodium silicate and water to obtain an alkaline slurry of microspheres of calcined clay in an aqueous solution containing sodium silicate, the sodium silicate used to dilute the clear seeds plus the sodium silicate added in step (d) being provided in amounts such that microspheres having a $SiO_2/Al_2O_3$ molar ratio of about 1.7–3.4 are obtained in step (f) below;
(e) heating the slurry of microspheres of calcined clay to a temperature and for a time sufficient to crystallize at least about 40% by weight Y-faujasite in the microspheres, said Y-faujasite being in the sodium form;
(f) separating the microspheres containing at least about 40% by weight Y-faujasite from at least a major portion of its mother liquor;
(g) and replacing sodium cations in the microspheres separated in step (f) with ammonium or rare earth cations or both.

* * * * *